（12） United States Patent
Goto

(10) Patent No.: US 7,965,873 B2
(45) Date of Patent: Jun. 21, 2011

(54) PORTABLE ELECTRONIC APPARATUS AND RECORDING MEDIUM

(75) Inventor: Yoshihiro Goto, Hamura (JP)

(73) Assignee: Casio Hitachi Mobile Communications Co., Ltd., Tokyo (JP)

( * ) Notice: Subject to any disclaimer, the term of this patent is extended or adjusted under 35 U.S.C. 154(b) by 1076 days.

(21) Appl. No.: 11/801,437

(22) Filed: May 10, 2007

(65) Prior Publication Data

US 2007/0280515 A1  Dec. 6, 2007

(30) Foreign Application Priority Data

May 18, 2006  (JP) ................................ 2006-138784

(51) Int. Cl.
 *G06K 9/00* (2006.01)
(52) U.S. Cl. ....... 382/115; 382/116; 382/124; 340/5.52; 340/5.53; 340/5.8; 340/5.81; 340/5.82; 340/5.83; 455/411; 379/93.02; 379/93.03
(58) Field of Classification Search .................. 382/115, 382/124, 125, 116; 340/5.52, 5.53, 5.8, 5.81–5.85; 455/411; 379/93.02, 93.03
See application file for complete search history.

(56) References Cited

U.S. PATENT DOCUMENTS

| | | | | | |
|---|---|---|---|---|---|
| 6,067,568 | A | * | 5/2000 | Li et al. ........................ | 709/223 |
| 7,304,570 | B2 | * | 12/2007 | Thomas et al. .......... | 340/539.11 |
| 7,420,546 | B2 | * | 9/2008 | Abdallah et al. ............. | 345/173 |
| 2002/0180585 | A1 | * | 12/2002 | Kim et al. .................... | 340/5.53 |
| 2003/0051138 | A1 | * | 3/2003 | Maeda et al. ................ | 713/168 |
| 2006/0095953 | A1 | * | 5/2006 | Frank ............................... | 726/1 |
| 2006/0117178 | A1 | * | 6/2006 | Miyamoto et al. ............ | 713/165 |
| 2006/0229988 | A1 | | 10/2006 | Oshima et al. | |

FOREIGN PATENT DOCUMENTS

| | | |
|---|---|---|
| CN | 1435795 | 8/2003 |
| JP | 2002-044727 | 2/2002 |
| JP | 2004-038870 | 2/2004 |
| JP | 2005-301360 | 10/2005 |
| JP | 2005-323083 | 11/2005 |
| JP | 2005323083 A * | 11/2005 |
| KR | 1020010054623 A | 7/2001 |
| WO | WO 01/45283 A1 | 6/2001 |
| WO | WO 2004066177 | 8/2004 |

OTHER PUBLICATIONS

European Search Report for the corresponding European Application No. EP 07 00 8567.

* cited by examiner

*Primary Examiner* — Matthew C Bella
*Assistant Examiner* — Eric Rush
(74) *Attorney, Agent, or Firm* — Cohen Pontani Lieberman & Pavane LLP

(57) ABSTRACT

Changing of setting of a predetermined function or file that is selected is controlled only be performing fingerprint authentication while data regarding the predetermined function or file is displayed on a display unit. While data regarding a function arbitrarily selected by an input unit from a plurality of functions is displayed on the display unit, a control unit authenticates a user based on fingerprint information representing a fingerprint pattern read by a fingerprint sensor and registered fingerprint information pre-stored in a fingerprint information area. If the authentication is successful, the control unit changes a "user restriction flag" associated with the function selected by the input unit in protection setting information stored in a user restriction flag storage area to an effective state or an ineffective state.

11 Claims, 15 Drawing Sheets

| FINGERPRINT INFORMATION FI1 | E-MAIL |
| FINGERPRINT INFORMATION FI1, FI2 | ADDRESS BOOK |
| FINGERPRINT INFORMATION FI1, FI2 | SCHEDULE BOOK |
| FINGERPRINT INFORMATION FI1, FI2 | TASK LIST |
| FINGERPRINT INFORMATION FI2 | NOTEPAD DATA |

| E-MAIL | INEFFECTIVE |
| ADDRESS BOOK | INEFFECTIVE |
| SCHEDULE BOOK | EFFECTIVE |
| TASK LIST | INEFFECTIVE |
| NOTEPAD DATA | INEFFECTIVE |

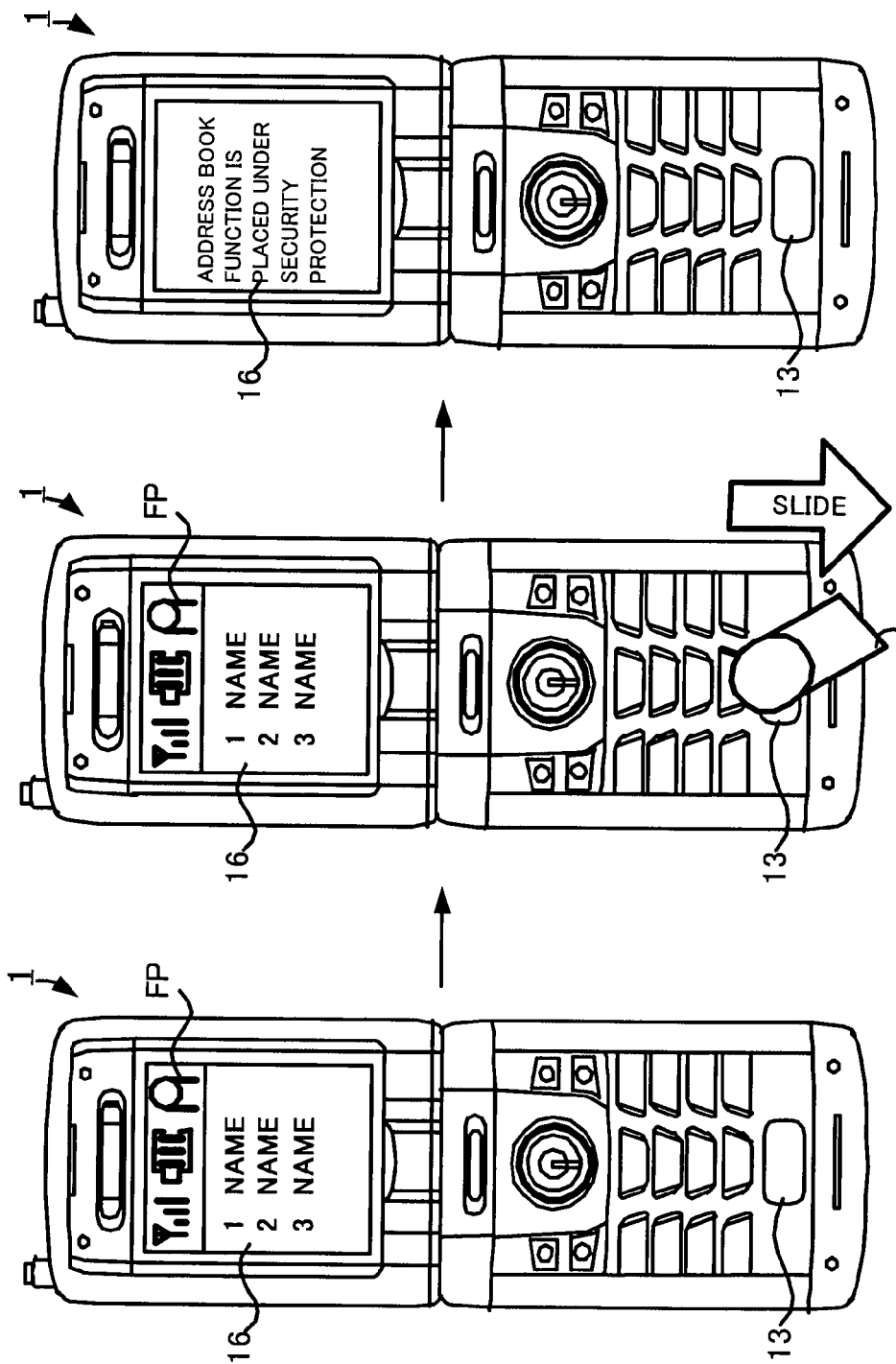

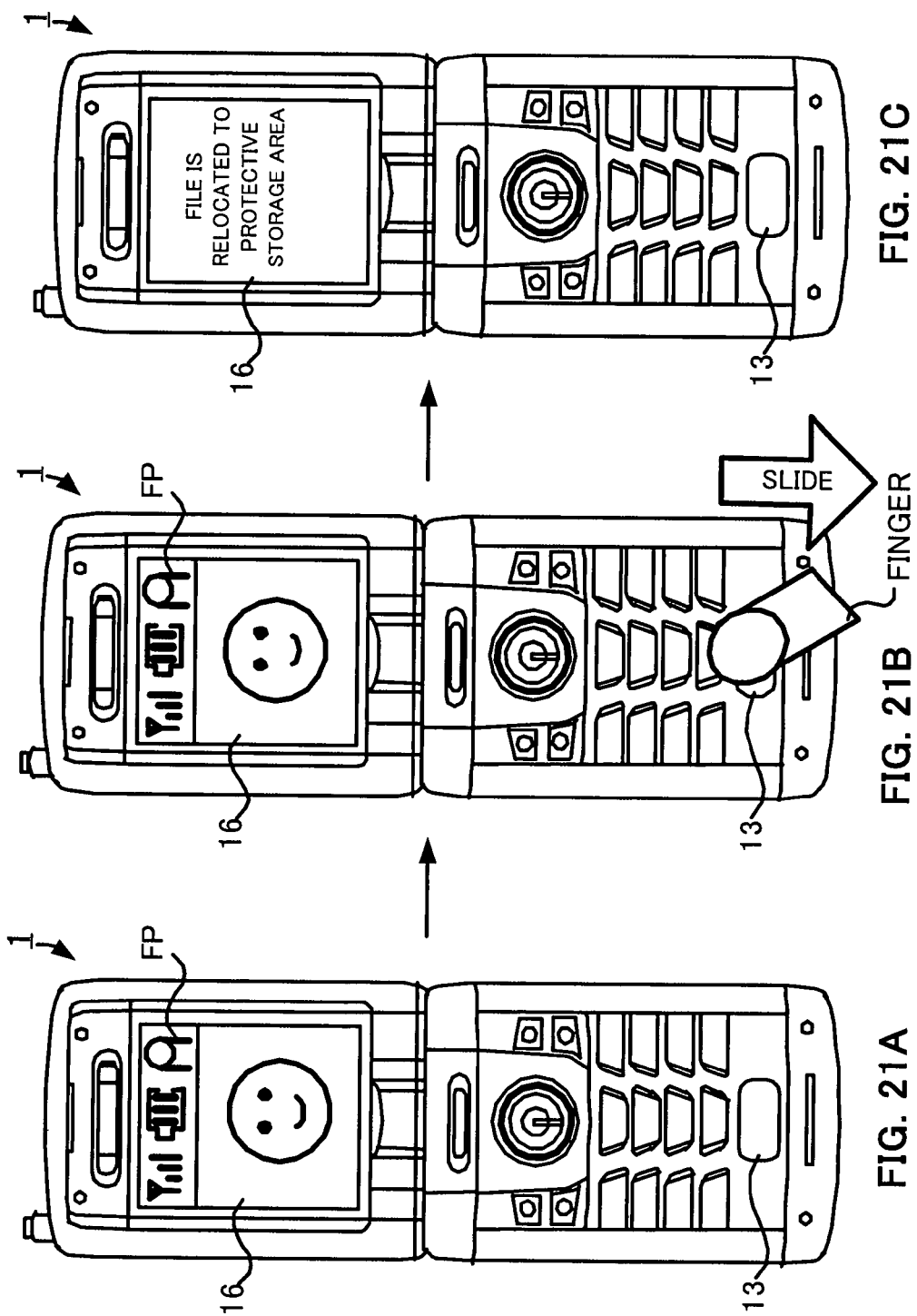

PORTABLE ELECTRONIC APPARATUS AND RECORDING MEDIUM

BACKGROUND OF THE INVENTION

1. Field of the Invention

The present invention relates to a portable electronic apparatus having a biometric recognition function, and a recording medium.

2. Description of the Related Art

There has been proposed a portable electronic apparatus, which authenticates a user based on the fingerprint pattern of the user and permits or prohibits the use of a function managed under security protection based on whether the authentication is successful or not.

Unexamined Japanese Patent Application KOKAI Publication No. 2005-323083 discloses a portable terminal apparatus which allows a user to pre-register fingerprint information of the user in association with information specifying a function, so that the use of the function associated with the registered fingerprint information may be permitted or prohibited in a case where user authentication based on fingerprint information detected by detection means and the registered fingerprint information is successful.

This portable terminal apparatus allows the user to switch between permitting and prohibiting the use of a function that requires privacy protection based on fingerprint information, by associating the fingerprint information with information specifying the function that requires privacy protection.

However, with this portable terminal apparatus, when the user sets whether to permit or prohibit the use of a function, he/she needs to bring up a menu for changing a control parameter for controlling the security of the function on the display while the function is activated to select whether to set the security setting effective or ineffective, and thereafter needs to input his/her fingerprint for the fingerprint authentication purpose.

These plurality of predetermined operations are bothersome and not user-friendly in terms of operation easiness.

Further, this portable terminal apparatus can permit or prohibit the use of a file based on fingerprint information. In a case where there is a file which cannot set under security protection, the portable terminal apparatus can switch between permitting and prohibiting the use of this file by storing the file in a folder which is set under security protection.

However, in order to switch between permitting and prohibiting the use of data which cannot be set under security protection, the user has to set the folder in which the data is to be stored under security protection together with relocating the data to this folder set under security protection, going through bothersome operations to switch between permitting and prohibiting the use.

SUMMARY OF THE INVENTION

The present invention was made in view of the above-described problems, and an object of the present invention is to provide a portable electronic apparatus which does not display a menu for changing setting information regarding a function while the function is activated, when the user is to restrict the persons who can use the function or cancel the restriction.

To solve the above-described problems, a portable electronic apparatus according to the present invention comprises:

a biometric information reading unit which reads biometric information of a user;

an association information storage unit which stores, for each of a plurality of functions prepared in the portable electronic apparatus, biometric information of an administrator who is entitled to restrict a function user, who can use the function, in association with setting information including function user restriction information for restricting a function user of the function;

a function selection unit which selects at least one function from the plurality of functions;

a determination unit which, in a case where the biometric information of the user is read by the biometric information reading unit while a function selected by the function selection unit is working, determines whether or not the read biometric information coincides with the biometric information of the administrator associated with the selected function in the association information storage unit; and a setting change unit which changes the function user restriction information in the association information storage unit that is associated with the function selected by the function selection unit, in response to that the determination unit determines that the read biometric information coincides with the biometric information of the administrator.

To solve the above-described problems, a portable electronic apparatus according to the present invention may comprise:

a biometric information reading unit which reads biometric information of a user;

a file storage unit which stores files;

an association information storage unit which stores, for each of a plurality of files stored in the file storage unit, biometric information of an administrator who is entitled to restrict access to the file, in association with setting information including accesser restriction information set for the file stored;

a file selection unit which selects at least one file from the files stored in the file storage unit;

a determination unit which, in a case where the biometric information of the user is read by the biometric information reading unit while a file selected by the function selection unit is working, determines whether or not the read biometric information coincides with the biometric information of the administrator associated with the selected file in the association information storage unit; and a setting change unit which changes the setting information in the association information storage unit that is associated with the file selected by the file selection unit, in response to that the determination unit determines that the read biometric information coincides with the biometric information of the administrator.

Further, to solve the above-described problems, there is provided a recording medium which stores a program for controlling a computer to perform principal functions of the present invention.

According to the present invention, by changing setting of whether or not to restrict the user of a selected function or file based on fingerprint authentication while the function or file selected is working, it becomes unnecessary to display a menu for changing setting information of the function while the function is activated, which makes it possible to improve operability and convenience.

BRIEF DESCRIPTION OF THE DRAWINGS

These objects and other objects and advantages of the present invention will become more apparent upon reading of the following detailed description and the accompanying drawings in which:

FIG. 11A is a diagram showing a state that a "name list" is displayed on a display unit by an address book function selected;

FIG. 11B is a diagram showing a state that a fingerprint pattern of a user is read by a fingerprint sensor 13;

FIG. 11C is a diagram showing a state that a message showing that users of the selected function are restricted is displayed on the display unit;

FIG. 21A is a diagram showing a state that data of a selected file is displayed on the display unit;

FIG. 21B is a diagram showing a state that a fingerprint pattern of a user is read by the fingerprint sensor 13; and FIG. 21C is a diagram showing a state that a message showing that the selected data (for example, photo data) is relocated to a protective storage area is displayed on the display unit.

DETAILED DESCRIPTION OF THE PREFERRED EMBODIMENT

An embodiment of the present invention will be explained below with reference to FIG. 1 to FIG. 21.

In the present embodiment, a portable telephone apparatus 1 is used as a portable electronic apparatus.

The portable telephone apparatus 1 authenticates a user based on fingerprint information indicating a fingerprint pattern of a user read by a fingerprint sensor and fingerprint information pre-registered, and permits or prohibits the use of a predetermined function or predetermined data according to whether the authentication is successful or not.

Figure 1:
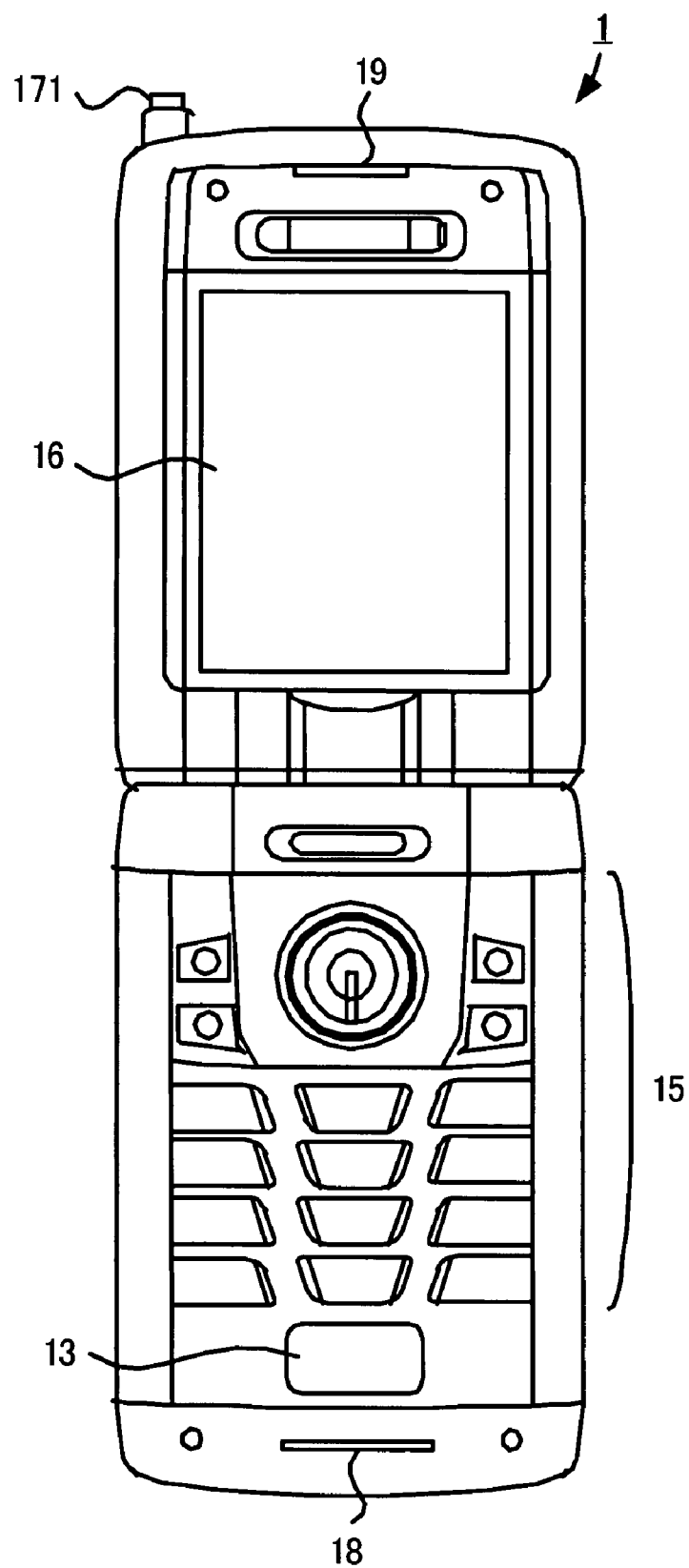
FIG. 1 is a diagram showing the appearance of a portable telephone apparatus according to an embodiment of the present invention, when it is opened and seen in front of it.

The portable telephone apparatus 1 comprises a display unit 16, an antenna 171, and a sound output unit 19 on its upper body, and a fingerprint sensor 13, an input unit 15, and a sound input unit 18 on its lower body, as shown in the appearance diagram of FIG. 1.

The user selects an arbitrary function from predetermined functions prepared in the portable telephone apparatus 1 from the input unit 15, and can use the selected function (hereinafter referred to as "function of choice").

Further, the user can change a user restriction flag for restricting users who are entitled to the function of choice to be effective or ineffective, by inputting his/her own fingerprint pattern through the fingerprint sensor 13 while an image regarding the function of choice is displayed on the display unit 16.

The structure of the portable telephone apparatus 1 will be explained below in detail.

Figure 2:
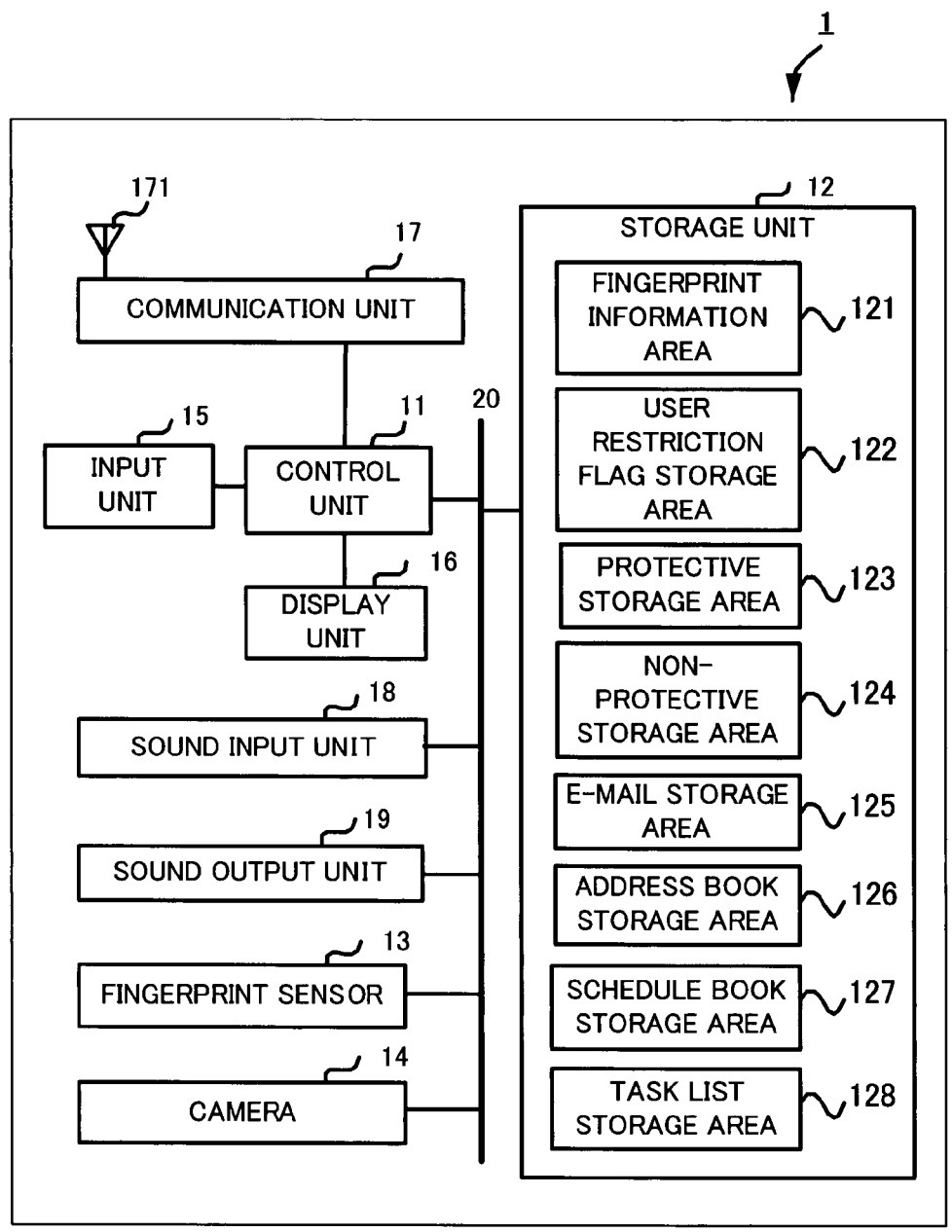
FIG. 2 is a block diagram showing the circuit structure of the portable telephone apparatus according to the embodiment of the present invention.

The portable telephone apparatus 1 comprises a control unit 11, a storage unit 12, a fingerprint sensor 13, a camera 14, an input unit 15, a display unit 16, a communication unit 17, a sound input unit 18, a sound output unit 19, and a bus 20, as shown in the circuit structure of FIG. 2.

The control unit 11 is constituted by a CPU (Central Processing Unit), and controls the entire operations of the portable telephone apparatus 1 according to an operation program stored in the storage unit 12.

For example, the control unit 11 generates registered fingerprint information representing a fingerprint pattern of the user which is read by the fingerprint sensor 13 at the time of fingerprint setting registration, and stores the registered fingerprint information in a fingerprint information area 121.

At the time of user authentication, the control unit 11 compares fingerprint information read by the fingerprint sensor 13 with the registered fingerprint information stored in the fingerprint information area 121 and determines whether or not the fingerprint characteristics coincide to authenticate the user.

Further, the control unit 11 has functions for managing e-mail information, address book information, schedule book information, etc., according to programs in the storage unit 12.

The storage unit 12 comprises a non-volatile memory such as a flash memory, etc., a RAM (Random Access Memory), and the like, and stores programs, etc. for enabling the control unit 11 to perform the processes shown by the flowcharts of FIGS. 3 to 9 and FIGS. 12 to 20. The storage unit 12 also serves as a work memory of the control unit 11.

The storage unit 12 may be a built-in memory of the portable telephone apparatus 1, or may be a detachable external memory. An external memory may be, for example, a smart medium, an IC card, etc, and externally supplies image data, data of various types, programs, etc. to the portable telephone apparatus 1, The storage unit 12 includes a fingerprint information area 121, a user restriction flag storage area 122, a protective storage area 123, a non-protective storage area 124, an e-mail storage area 125, an address book storage area 126, a schedule book storage area 127, and a task list storage area 128.

These storage areas will be described in detail later.

The fingerprint sensor 13 reads a fingerprint by using, for example a semiconductor structure, and converts a charge amount corresponding to the ridges and grooves of the fingerprint into a voltage value and then converts the voltage value into a digital image (fingerprint image data). In the present embodiment, in order to make the sensor surface (electrode surface) of the fingerprint sensor 13 small, the sensor structure requires the user to slide his/her finger in a predetermined direction (top-down direction) as shown in FIG. 11B when reading the user's fingerprint pattern.

The camera 14 is constituted by a CCD (Charge Coupled Devices) camera or the like, and captures a still image or a moving image.

The input unit 15 comprises a keyboard, a touch panel, etc., and outputs various instructions and data to the control unit 11 in response to inputs from the user. For example, when the user depresses a power button, the portable telephone apparatus 1 is activated.

The display unit 16 comprises a dot-matrix type LCD (Liquid Crystal Display) panel, a driver circuit, etc., and displays an arbitrary image.

For example, the display unit 16 displays an operation status of a program, a primary operation screen for the operator, an image regarding an address book function or any other function, etc.

Further, as shown in FIG. 11A, symbolic images of an antenna pictograph indicating the strength of an electric field received from a base station, a battery icon indicating the battery remaining amount, a fingerprint icon FP indicating that the fingerprint sensor 13 is now active to perform fingerprint detection, etc., are displayed on the top end of the screen of the display unit 16. Further, the display unit 16 displays images corresponding to signals acquired by an e-mail function, a Web access function, etc. through the communication unit 17.

The communication unit 17 gains connection to a wireless or wired communication network, and performs audio communication such as a phone call, etc., and data communication such as an e-mail, web, etc. The communication unit 17 comprises a modulation unit and a demodulation unit for modulating and demodulating data to be exchanged.

The sound input unit 18 is constituted by a microphone or the like, collects a sound input signal when a telephone talk is being made, converts it into an electric signal, and supplies it to the communication unit 17.

The sound output unit 19 is constituted by a speaker or the like, converts an electric signal supplied from the communication unit 17 when a telephone talk is being made into an analog sound signal, and outputs the signal.

The bus 20 transfers data to and from between the control unit 11, the storage unit 12, the fingerprint sensor 13, the camera 14, the sound input unit 18, and the sound output unit 19.

Now, with reference to FIG. 2, the storage areas in the storage unit 12, i.e., the fingerprint information area 121, the user restriction flag storage area 122, the protective storage area 123, the non-protective storage area 124, the e-mail storage area 125, the address book storage area 126, the schedule book storage area 127, and the task list storage area 128, will be explained in detail.

The fingerprint information area 121 stores fingerprint information acquired through analysis of a fingerprint pattern read by the fingerprint sensor 13.

Figures 9, 10A, 10B:
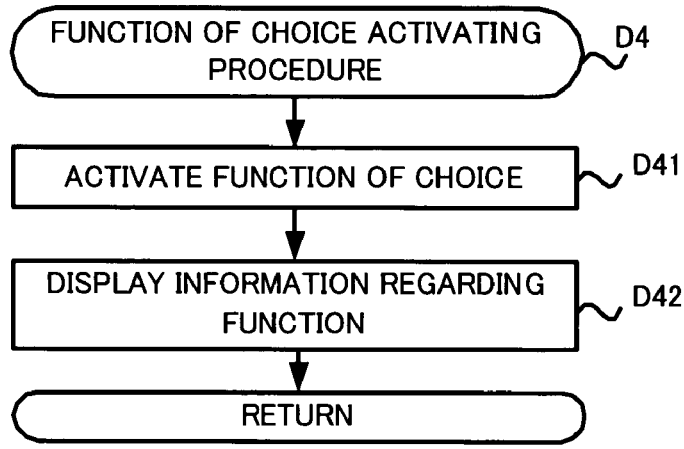
FIG. 9 is a flowchart showing the process of a function of choice activating procedure in the function selection procedure.
FIG. 10A is a diagram showing an example of the data structure of a fingerprint information area.
FIG. 10B is a diagram showing an example of the data structure of a user restriction flag storage area.
Figure 12:
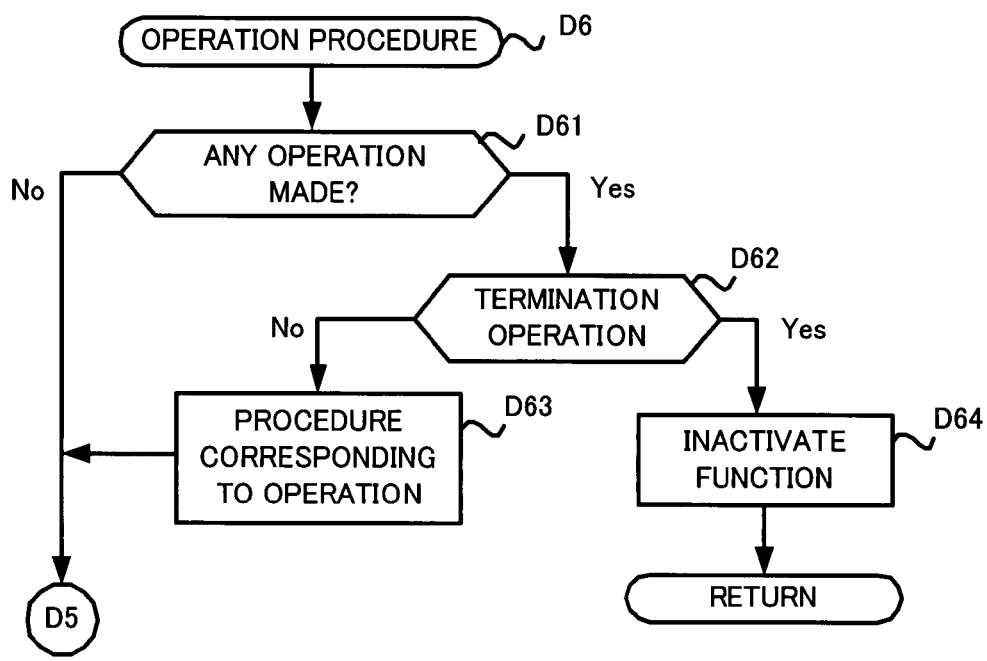
FIG. 12 is a flowchart showing the process of an operation procedure in the function selection procedure.
Figure 13:
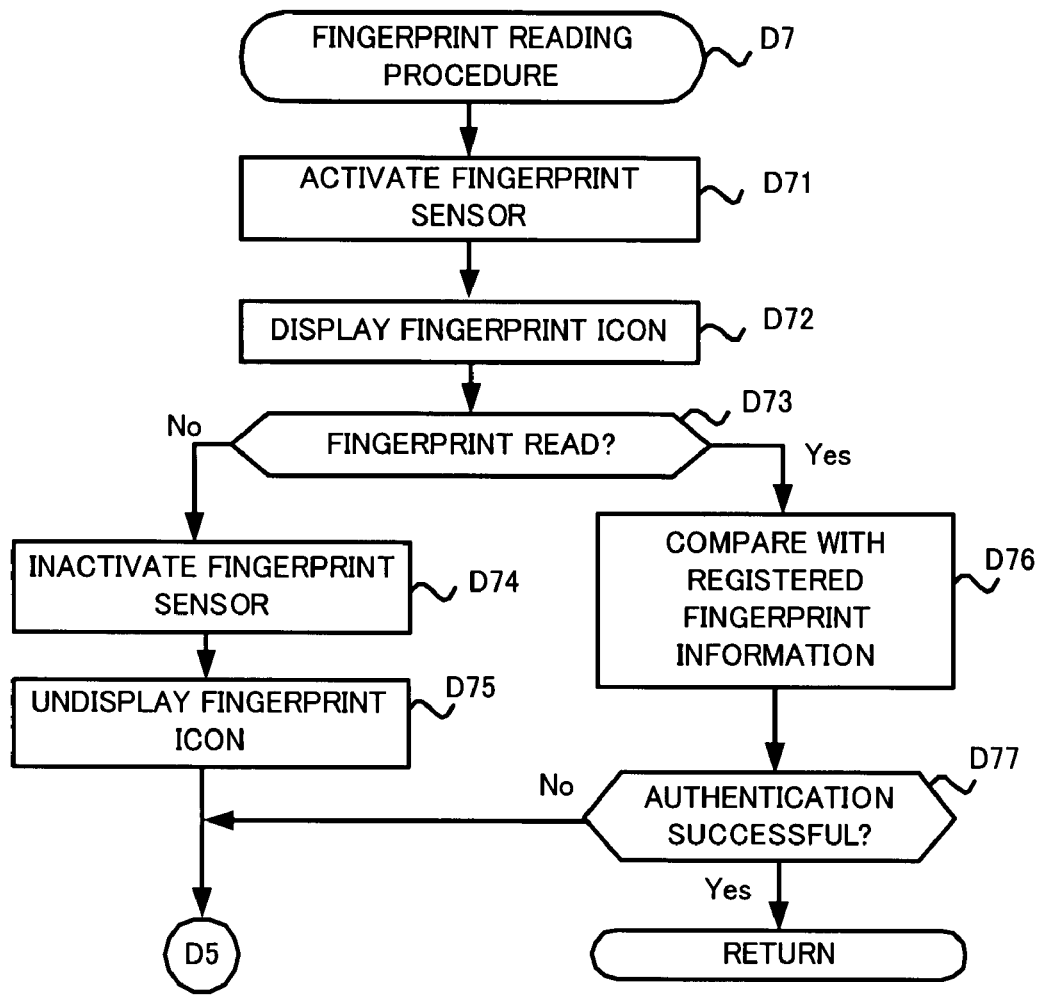
FIG. 13 is a flowchart showing the process of a fingerprint reading procedure in the function selection procedure.

For example, the fingerprint information area 121 stores registered fingerprint information representing a fingerprint pattern of the user read by the fingerprint sensor 13 and registered at the time of fingerprint setting registration. Fingerprint patterns of a plurality of users can be registered as registered fingerprint information, and, for example, fingerprint information FI1 and fingerprint information FI2 are registered as shown in FIG. 10A. The registered fingerprint information is referred to by the control unit 11 at the time of user authentication.

Each function prepared in the portable telephone apparatus 1 is associated with registered fingerprint information (information representing a fingerprint pattern), and a user related to any registered fingerprint information is an administrator who is entitled to change the setting of the function associated with the registered fingerprint information.

For example, administrators related to the fingerprint information FI1 and fingerprint information FI2 can both change the settings of the address book function, the schedule book function, and the task list function, as shown in FIG. 10A. The administrator related to the fingerprint information FI1 is entitled to change the setting of the e-mail function, but not entitled to change the setting of a notepad data function. The administrator related to the fingerprint information FI2 can change the setting of the notepad data, but cannot change the setting of the e-mail function.

The user restriction flag storage area 122 is an area for storing protection setting information that associates the functions of the portable telephone apparatus 1 with user restriction flags.

"User restriction flag" is a flag which indicates that a setting for restricting users of any function is "effective" or "ineffective". User restriction flags can be changed by the user who can succeed in fingerprint authentication, i.e., the administrator who is entitled to change the settings of the e-mail function, the address book function, the schedule book function, the task list function, and the notepad data function, according to the information stored in the fingerprint information area 121.

In the present embodiment, the protection setting information has a data structure in which user restriction flags are associated with the e-mail function, the address book function, the schedule book function, the task list function, and the notepad data function respectively, as shown in FIG. 10B.

In the protection setting information of FIG. 10B, the user restriction flag associated with the schedule book function is indicated as "effective", meaning that the schedule book function is under user restriction setting. In this case, the data related to the schedule book function is not displayed on the display unit 16.

On the other hand, the functions other than the schedule book function have the user restriction set ineffective, being free from user restriction (protection by security). In his case, the data related to the functions other than the schedule book function can be displayed on the display unit 16 to be viewed by the user.

The protective storage area 123 stores carbitrarily selected data, by placing the data under a condition that the person who is entitled to access the data is restricted to the administrator (a condition that protection by security is applied).

In the present embodiment, the protective storage area 123 is set to allow an administrator, who can succeed in authentication by fingerprint authentication, to freely view the data stored in the protective storage area 123. For example, in a case where image data stored in the non-protective storage area 124 is relocated to the protective storage area 123, any persons other than the administrator who can succeed in authentication will be prohibited from viewing this image data.

On the other hand, the protective storage area 123 is set to prohibit any user, who fails in authentication, from viewing data stored therein.

The non-protective storage area 124 stores arbitrarily selected data under a condition that user restriction is not applied. Information stored in the non-protective storage area 124 can be accessed regardless of whether user authentication is successful or not, i.e., can be viewed also by persons other than the administrator.

In the present embodiment, data stored in the non-protective storage area 124 include an image file representing the face of a person displayed on the screen of the display unit 16 shown in FIG. 21A.

The e-mail storage area 125 stores incoming e-mails received, and outgoing e-mails sent by the user.

The address book storage area 126 stores data used for the address book function. Data used for the address book function is, for example, information regarding names registered in the address book, displayed on the display unit 16 of FIG. 11A.

The schedule book storage area 127 stores data used for the schedule book function.

The task list storage area 128 stores data used for the task list function.

Next, with reference to FIGS. 11A to 11C, an operation performed by the portable telephone apparatus 1 having the above-described structure to apply user restriction (security lock) to a function arbitrarily selected, will be explained. Here, it is assumed that the address book function is selected, for example.

When the address book function is selected, a "name list" is read out from the address book storage area 126 and displayed on the display unit 16, as a screen related to the address book function, as shown in FIG. 11A.

Further, the strength of the received electric field, the battery remaining amount, etc., and a fingerprint icon FP having a fingertip shape, indicating that the fingerprint sensor 13 is active to perform fingerprint detection are displayed on the pictograph area of the screen of the display unit 16.

Then, when the user slides his/her finger in the top-down direction while keeping the finger in touch with the sensor surface (electrode surface) of the fingerprint sensor 13 as shown in FIG. 11B, the fingerprint sensor 13 performs fingerprint detection and the control unit 11 authenticates the user based on the detected fingerprint pattern information.

When the user authentication ends in success, the control unit 11 makes the user restriction setting effective by setting the "user restriction flag" in the protection setting information, that is associated with the address book function now activated, effective, or makes the user restriction setting ineffective by setting the "user restriction flag" ineffective.

For example, in a case where the user restriction flag is set effective, a message showing that the address book function is placed under security protection is displayed on the screen of the display unit 16, as shown in FIG. 11C.

Next, the operation concept of the portable telephone apparatus 1 of the present embodiment will be explained in detail with reference to the flowcharts shown in FIGS. 3 to 9 and FIGS. 12 to 20.

Figure 3:
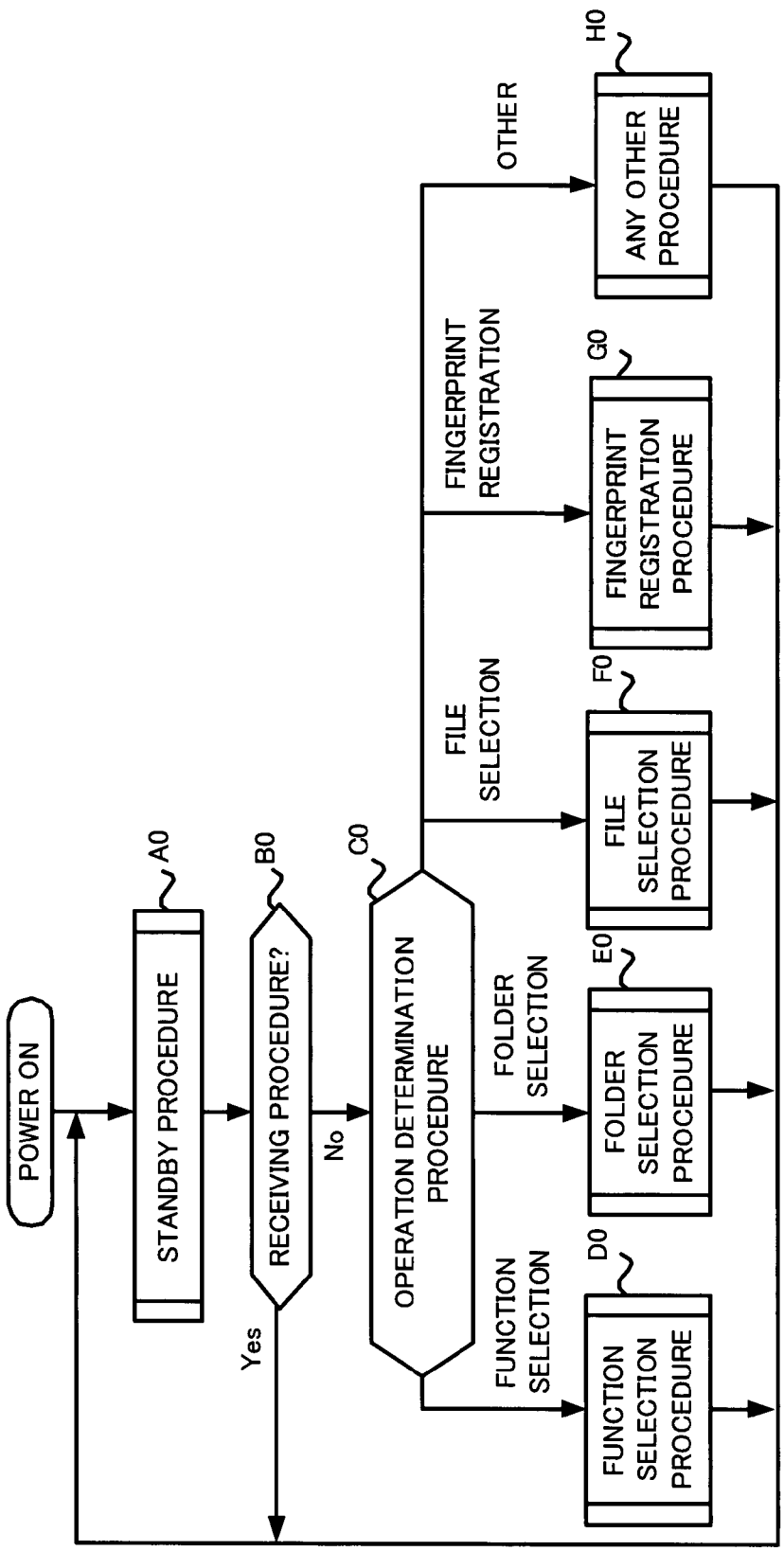
FIG. 3 is a flowchart showing the overall operation of the portable telephone apparatus according to the embodiment of the present invention.

The process of the flow of FIG. 3 is activated when the power button of the portable telephone apparatus 1 is depressed.

When the power button of the portable telephone apparatus 1 is depressed, the control unit 11 reads out a predetermined standby image from the storage unit 12 and outputs it on the display unit 16 to be on standby for receiving a call or an e-mail, as shown in FIG. 3 (step A0).

In a case where a call or an e-mail is received in the state of step A0, the control unit 11 proceeds to a receiving procedure (step B0). When a call or an e-mail is received (step B0; Yes), the control unit 11 issues a notification of the reception, and performs a telephone talk procedure or an incoming e-mail receiving procedure.

In a case where nothing is received (step B0; No) but the user makes any operation from the input unit 15, the control unit 11 determines which operations of i) function selection, ii) folder selection, iii) file selection, iv) fingerprint registration, and v) selection of any other operations the user makes, in an operation determination procedure (step C0).

In a case where a function selection operation is made (step C0; function selection), the control unit 11 proceeds to a function selection procedure (step D0). Hereinafter, a function selected by a function selection operation will be referred to as "function of choice".

In a case where a folder selection operation is made (step C0; folder selection), the control unit 11 proceeds to a folder selection procedure (step E0). Hereinafter, a folder selected by a folder selection operation will be referred to as "folder of choice".

In a case where a file selection operation is made (step C0; file selection), the control unit 11 proceeds to a file selection procedure (step F0). Hereinafter, a file selected by a file selection operation will be referred to as "file of choice".

In a case where a fingerprint registration operation is made (step C0; fingerprint registration), the control unit 11 proceeds to a fingerprint registration procedure (step G0).

In a case where any other operation is made (step C0; other), the control unit 11 performs a telephone call making procedure, an e-mail generation procedure, an e-mail sending procedure, etc. according to an instruction signal from the input unit 15 (step H0).

The procedures to be performed according to the operation determination result in the operation determination procedure (step C0), i.e., the function selection procedure (step D0), the folder selection procedure (step E0), the file selection procedure (step F0), and the fingerprint registration procedure (step G0) will be explained in detail.

First, with reference to FIG. 4 and FIG. 5, the fingerprint registration procedure (step G0) will be explained.

Figure 4:
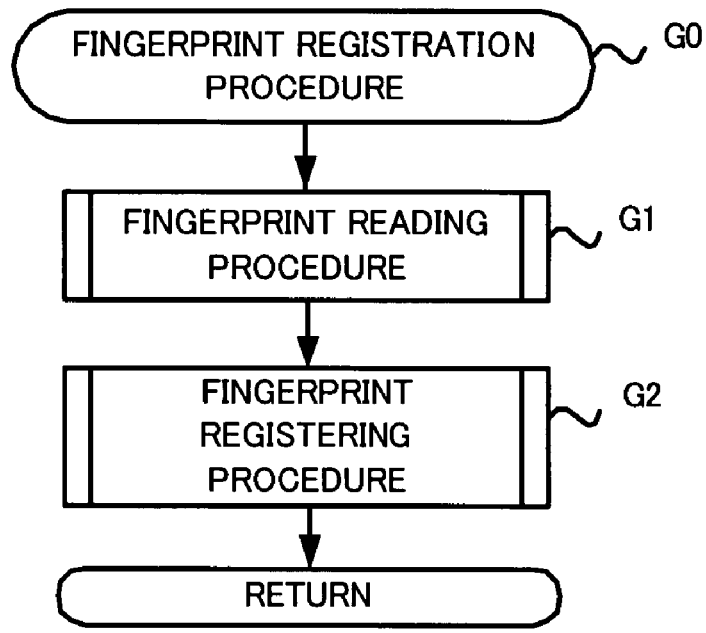
FIG. 4 is a flowchart showing the process of a fingerprint registration procedure.

As shown in FIG. 4, the fingerprint registration procedure (step G0) includes a fingerprint reading procedure (step G1) and a fingerprint registering procedure (step G2).

Figure 5:
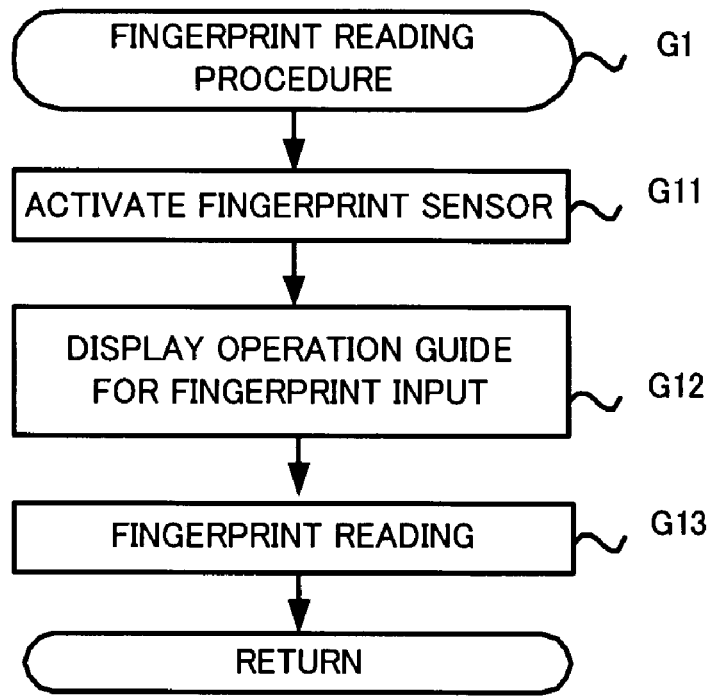
FIG. 5 is a flowchart showing the process of a fingerprint reading procedure in the fingerprint registration procedure.

In the fingerprint registration procedure (step G0), the fingerprint reading procedure (step G1) of FIG. 5 is first performed, in which the fingerprint sensor 13 is set active to operate (step G11), and then an operation guide for fingerprint input is displayed (step G12).

When the user slowly slides his/her finger while keeping the finger in touch with the sensor surface of the fingerprint sensor 13 according to the operation guide, and when a fingerprint is therefore detected by the fingerprint sensor 13 (step G13), fingerprint information representing the detected fingerprint pattern is sequentially written in an unillustrated work area of the storage unit 12 and stored therein temporarily.

The control unit 11 analyzes the fingerprint information and registers the fingerprint information as authentication information in the fingerprint information area 121 (step G2). When the fingerprint registration procedure (step G0) is completed, the control unit 11 proceeds to the standby procedure (step A0).

Next, with reference to FIGS. 6 to 14, the function selection procedure (step D0) will be explained.

Figure 6:
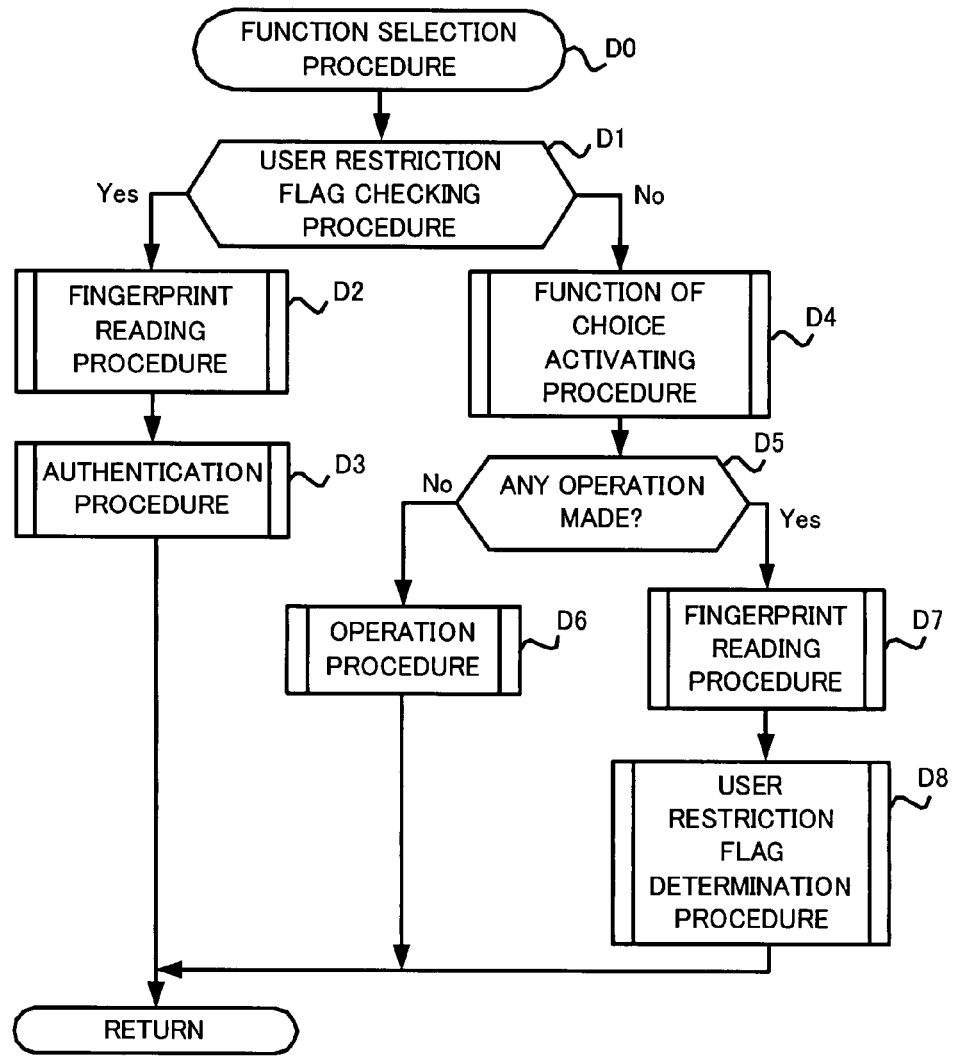
FIG. 6 is a flowchart showing the process of a function selection procedure.

As shown in FIG. 6, the function selection procedure (step D0) includes a user restriction flag checking procedure (step D1), a fingerprint reading procedure (step D2), an authentication procedure (step D3), a function of choice activating procedure (step D4), an operation determination procedure (step D5), an operation procedure (step D6), a fingerprint reading procedure (step D7), and a user restriction flag determination procedure (step D8).

In the function selection procedure (step D0), first, the control unit 11 determines whether the user restriction flag associated with the function of choice is effective or not in the user restriction flag checking procedure (step D1).

In a case where the user restriction flag is effective (step D1; Yes), the control unit 11 proceeds to the fingerprint reading procedure (step D2).

Figure 7:
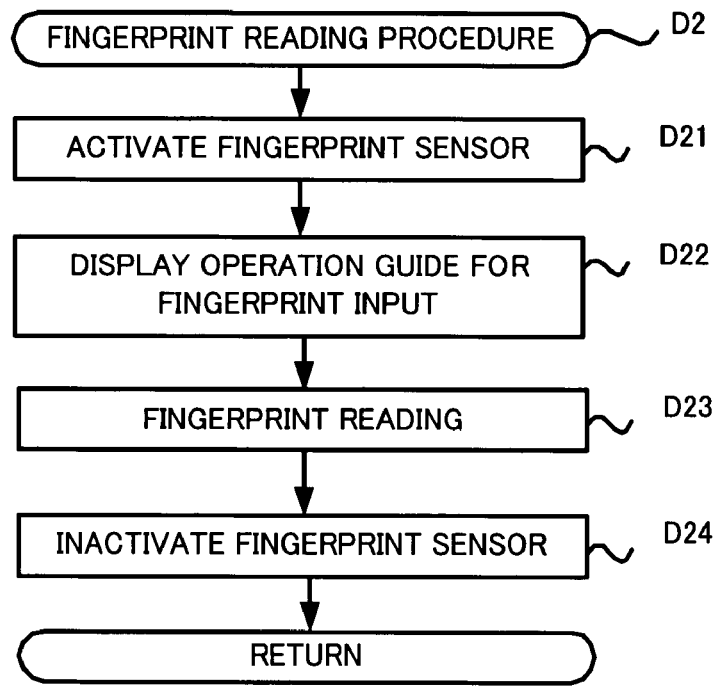
FIG. 7 is a flowchart showing the process of a fingerprint reading procedure in the function selection procedure.

In the fingerprint reading procedure (step D2), as shown in FIG. 7, the control unit 11 activates the fingerprint sensor 13 to be operable (step D21), and displays an operation guide for fingerprint input on the display unit 16 (step D22).

When the user makes an operation according to the operation guide and the fingerprint sensor 13 detects a fingerprint (step D23), the control unit 11 analyzes the fingerprint information sequentially read by the fingerprint sensor 13 and generates registered fingerprint information for authentication purpose.

Then, the control unit 12 inactivates the fingerprint sensor 13 (step D24), and proceeds to the authentication procedure (step D3).

Figure 8:
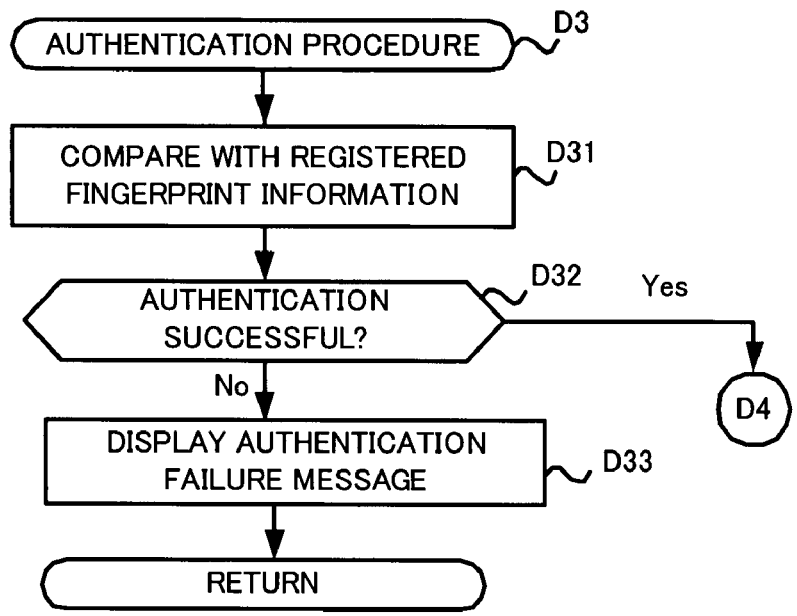
FIG. 8 is a flowchart showing the process of an authentication procedure in the function selection procedure.

In the authentication procedure (step D3), as shown in FIG. 8, the control unit 11 compares the registered fingerprint information read out from the fingerprint information area 121 with the fingerprint information read by the fingerprint sensor 13 (step D31), and determines whether or not the fingerprint characteristics coincide with each other to authenticate the user (step D32).

In a case where the fingerprint characteristics do not coincide and the user authentication ends in failure (step D32; No), the control unit 11 displays an NG (error) message showing that the user is prohibited from using the function of choice (step D33), and proceeds to the standby procedure (step A0).

In a case where the fingerprint characteristics coincide and the user authentication ends in success (step D32; Yes), the control unit 11 proceeds to the function of choice activating procedure (step D4) shown in FIG. 9.

On the other hand, in a case where the user restriction flag is ineffective (step D1; No), the control unit 11 proceeds to the function of choice activating procedure (step D4).

The function of choice activating procedure (step D4) will now be explained. In the present embodiment, it is assumed that the address book function is selected in the operation determination procedure (step C0).

In the function of choice activating procedure (step D4), as shown in FIG. 9, the control unit 11 activates the function of choice (address book function) to permit the use of the function of choice (step D41), and displays an image regarding the function of choice on the display unit 16 (step D42). In the case of the address book function, for example, the address book data (for example, a name list) shown in FIG. 11A is displayed on the display unit 16.

When the function of choice activating procedure (step D4) is completed, the control unit 11 proceeds to the operation determination procedure (step D5).

In the operation determination procedure (step D5), the control unit 11 determines whether or not a finger of the user touches the sensor surface (electrode surface) of the fingerprint sensor 13 (step D5) while the data related to the function of choice is displayed by the function of choice activating procedure (step D4). At step D5, whether or not a finger of the user touches the sensor surface (electrode surface) of the fingerprint sensor 13 to activate the fingerprint sensor 13 is determined, regardless of whether the ouch is a one-touch or a hold-touch.

If the sensor surface is not touched (step D5; No), the control unit 11 proceeds to the operation procedure (step D6) shown in FIG. 12.

In the operation procedure (step D6), the control unit 11 determines whether or not any key operation is made (step D61), and in a case where any key operation is made (step D61; Yes), determines whether or not the key operation is a termination operation for instructing the termination of the function of choice (step D62).

If the key operation is not a termination operation (step D62; No), the control unit 11 performs a procedure corresponding to the key operation (step D63), and proceeds to the operation determination procedure (step D5). In the case of the address book function, operations other than a termination operation are, for example, a detailed information display operation, an editing operation for adding or deleting data in the address book data, etc.

If the key operation is a termination operation for instructing termination (step D62; Yes), the control unit 11 terminates the function of choice (step D64), and proceeds to the standby procedure (step A0).

On the other hand, in a case where the sensor surface (electrode surface) of the fingerprint sensor 13 is touched by a finger of the user (step D5; Yes) in the operation determination procedure (step D5), the control unit 11 proceeds to the fingerprint reading procedure (step D7) shown in FIG. 13.

In the fingerprint reading procedure (step D7), the control unit 11 activates the fingerprint sensor 13 (step D71), and displays the fingerprint icon FP for showing that the fingerprint sensor 13 is activated to operable in the pictograph area on the screen of the display unit 16 as shown in FIG. 11A (step D72).

When the procedure of step D72 is completed, the control unit 11 counts time until a predetermined period of time (for example, five seconds) passes by an unillustrated timer, and determines whether or not the fingerprint sensor 13 detects a fingerprint within the predetermined period of time (step D73).

If no fingerprint is detected (step D73; No), the control unit 11 inactivates the fingerprint sensor 13 (step D74), and undisplays the fingerprint icon FP in the pictograph area of FIG. 11A (step D75). After this, the control unit 11 proceeds to the operation determination procedure (step D5), and waits until a finger of the user touches the fingerprint sensor 13.

If a fingerprint is detected within the predetermined period of time (for example, five seconds) (step D73; Yes), the control unit 11 compares the fingerprint information read by the fingerprint sensor 13 with the registered fingerprint information in the storage unit 12 (step D76), and determines whether or not the fingerprint characteristics coincide with each other based on the comparison result of step D76 to authenticate the user (step D77).

In a case where the authentication is unsuccessful (step D77; No), the control unit 11 determines that the operation is by an unauthorized irrelevant person, and proceeds to the operation determination procedure (step D5) to wait until a finger of the user touches the fingerprint sensor 13.

In a case where the authentication is successful (step D77; Yes), the control unit 11 proceeds to the user restriction flag determination procedure (step D8) shown in FIG. 14.

Figure 14:
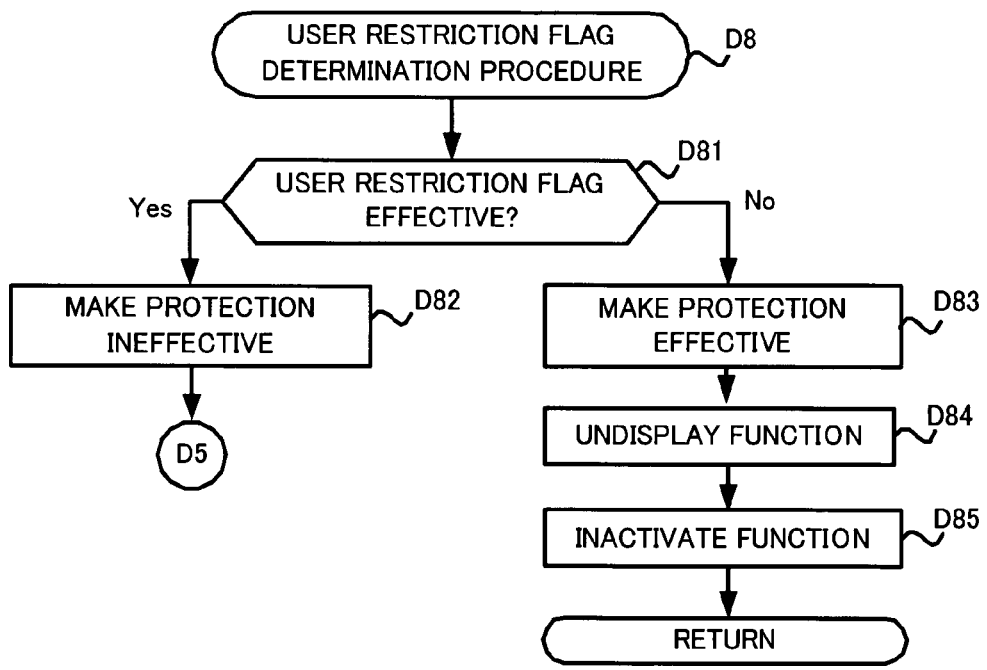
FIG. 14 is a flowchart showing the process of a user restriction flag determination procedure in the function selection procedure.

In the user restriction flag determination procedure (step D8) of FIG. 14, the control unit 11 first searches through the protection setting information based on the function of choice to determine whether or not the "user restriction flag" is effective (step D81), based on the premise that the portable telephone apparatus 1 is being operated by an authorized user.

In a case where the "user restriction flag" is ineffective (step D81; No), which means that the security lock has been canceled, the control unit 11 changes the user restriction flag from the ineffective state to the effective state (step D83), and undisplays the image related to the function of choice (step D84). After this, the control unit 11 terminates the function of choice (step D85), and proceeds to the standby procedure (step A0).

In a case where the "user restriction flag" is effective (step D81; Yes), the control unit 11 changes the user restriction flag from the effective state to the ineffective state (step D82), and proceeds to the operation determination procedure (step D5) to wait until a finger of the user touches the fingerprint sensor 13.

Next, with reference to FIGS. 15 and 16, the folder selection procedure (step E0), which is performed in a case where a folder selection operation is made in the operation determination procedure (step C0), will be explained.

Figure 15:
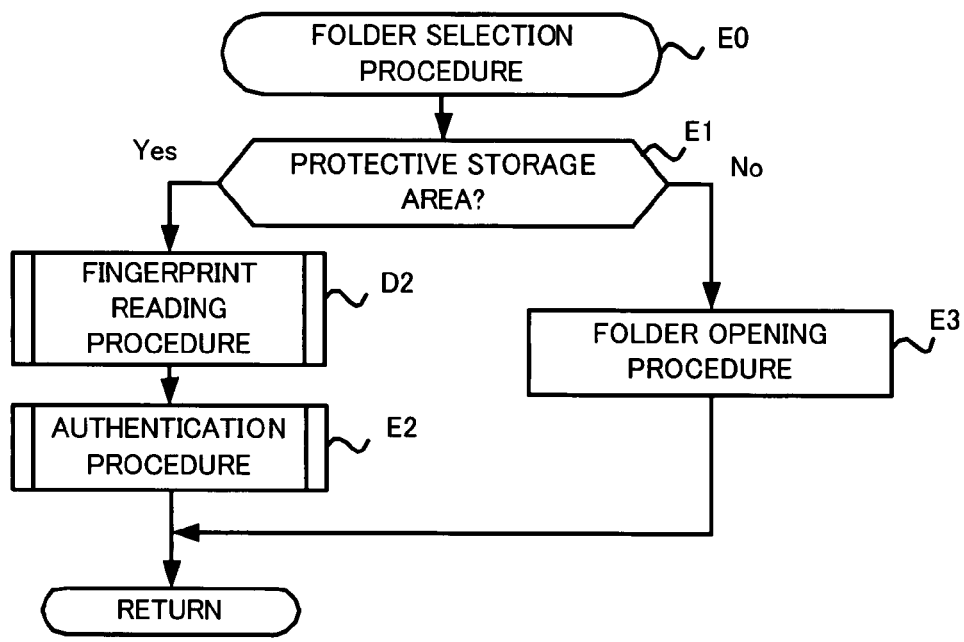
FIG. 15 is a flowchart showing the process of a folder selection procedure.

In FIG. 15, the same elements as those in FIG. 6 will be denoted by the same reference numerals as those used in FIG. 6.

As shown in FIG. 15, the folder selection procedure (step E0) includes a protective storage area determination procedure (step E1), a fingerprint reading procedure (step D2), an authentication procedure (step E2), and a folder opening procedure (step E3).

In the protective storage area determination procedure (step E1), first, the control unit 11 determines whether or not the folder of choice is in the protective storage area 123 which is under security protection. (step E1).

In a case where the folder of choice is other than those in the protective storage area 123 (step E1; No), the control unit 11 proceeds to the file opening procedure (step E3) to open the folder of choice and display the list of data stored in the folder of choice (step E3). When the folder opening procedure (step E3) is completed, the control unit 11 proceeds to the standby procedure (step A0).

In a case where the folder of choice is one in the protective storage area (step E1; Yes), the control unit 11 proceeds to the fingerprint reading procedure (step D2) of FIG. 7.

That is, the control unit 11 activates the fingerprint sensor 13 to be operable (step D21), and then displays an operation guide for fingerprint input on the display unit 16 (step D22). When the user performs an operation according to the operation guide and thereby the fingerprint sensor 13 detects a fingerprint (step D23), the control unit 11 analyzes the fingerprint information sequentially read by the fingerprint sensor 13 and converts it into registered fingerprint information for authentication purpose.

Then, the control unit 11 inactivates the fingerprint sensor 13 (step D24), and proceeds to the authentication procedure (step E2).

Figure 16:
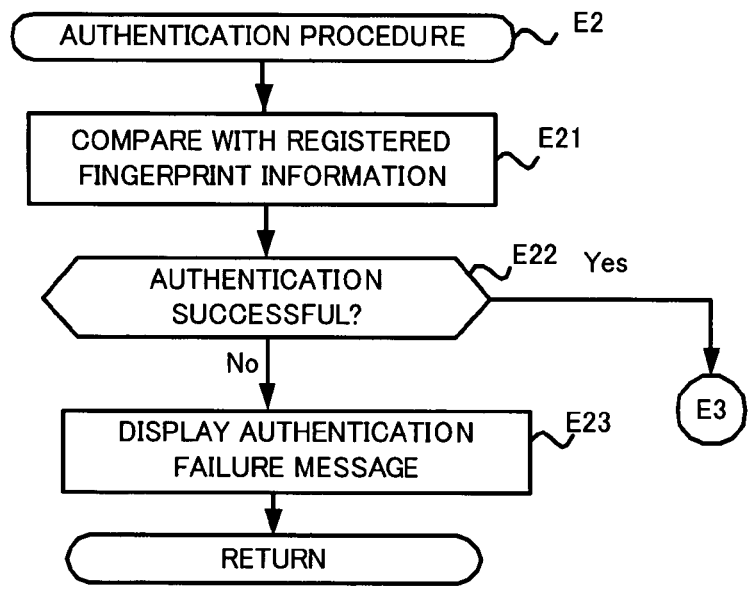
FIG. 16 is a flowchart showing the process of an authentication procedure in the folder selection procedure.

In the authentication procedure (step E2), as shown in FIG. 16, the control unit 11 compares the registered fingerprint information stored in the fingerprint information area 121 and the fingerprint information read by the fingerprint sensor 13 (step E21), and determines whether or not the fingerprint characteristics coincide with each other to authenticate the user (step E22).

In a case where the fingerprint characteristics do not coincide and the user authentication ends in failure (step E22; No), the control unit 11 displays an NG (error) message showing that the user is prohibited from using the folder of choice (step E23), and proceeds to the standby procedure (step A0).

In a case where the fingerprint characteristics coincide and the user authentication ends in success (step E22; Yes), the control unit 11 proceeds to the folder opening procedure (step E3).

Next, with reference to FIGS. 17 to 21, the file selection procedure (step F0), which is performed in a case where a file selection operation is made in the operation determination procedure (step C0), will be explained.

Figure 17:
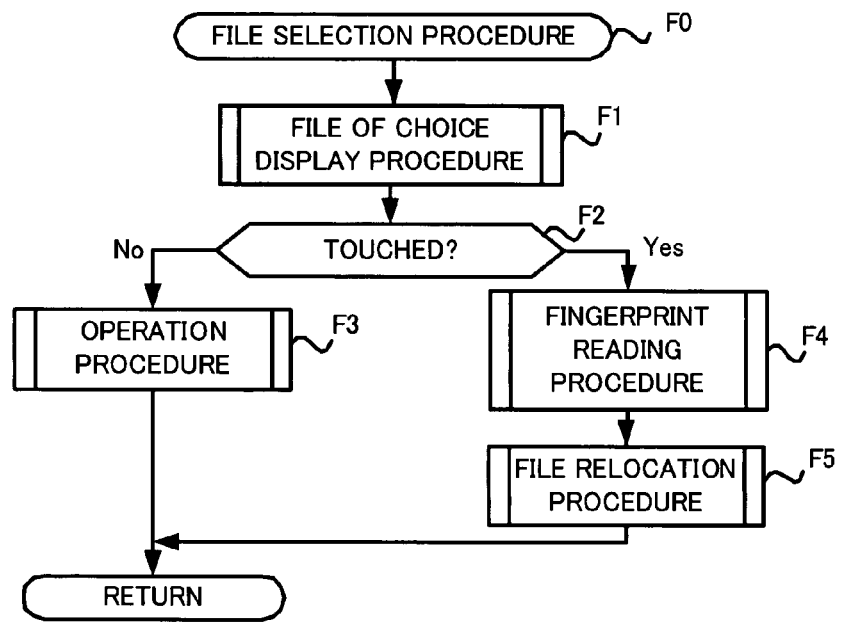
FIG. 17 is a flowchart showing the process of a file selection procedure.

As shown in FIG. 17, the file selection procedure (step F0) includes a file of choice display procedure (step F1), an operation determination procedure (step F2), an operation procedure (step F3), a fingerprint reading procedure (step F4), and a file relocation procedure (step F5).

In the file selection procedure (step F0), first, the control unit 11 performs the file of choice display procedure (step F1) to display the file of choice on the display unit 16 (step F1). When the file of choice display procedure (step F1) is completed, the control unit 11 proceeds to the operation determination procedure (step F2)

In the operation determination procedure (step F2), the control unit 11 determines whether or not a finger of the user touches the sensor surface (electrode surface) of the fingerprint sensor 13 in the state that the file of choice is displayed by the file of choice display procedure (step F1) (step F2). At step F2, it is determined whether or not a finger of the user touches the sensor surface (electrode surface) to activate the fingerprint sensor 13, regardless of whether the touch is a one-touch or a hold-touch.

In a case where the sensor surface is not touched by a finger of the user (step F2; No), the control unit 11 proceeds to the operation procedure (step F3).

Figure 18:
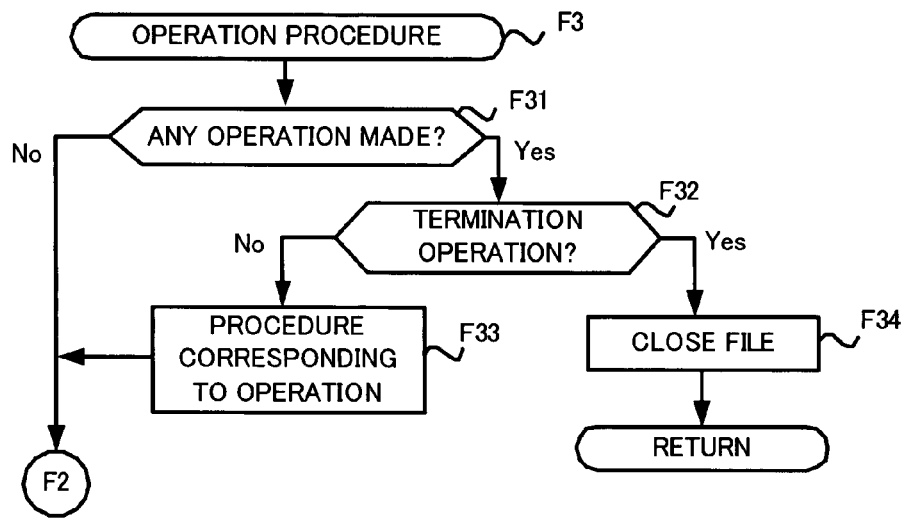
FIG. 18 is a flowchart showing the process of an operation procedure in the file selection procedure.
Figure 19:
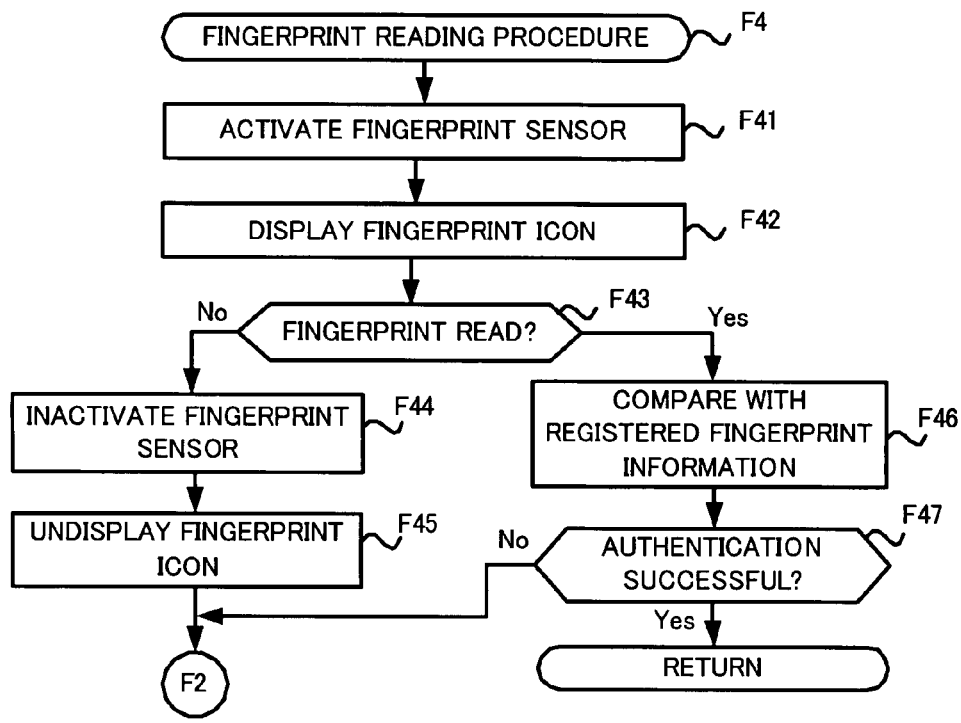
FIG. 19 is a flowchart showing the process of a fingerprint reading procedure in the file selection procedure.
Figure 20:
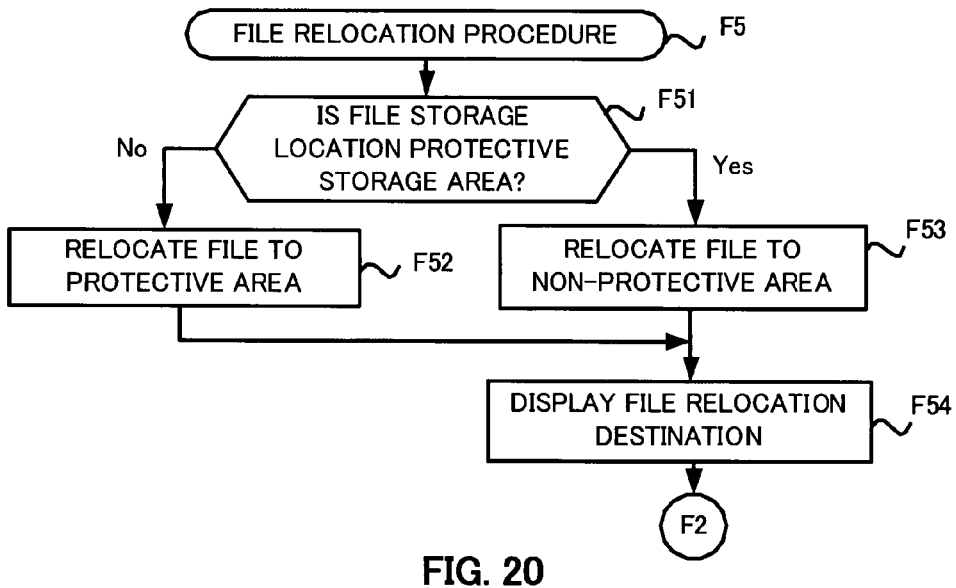
FIG. 20 is a flowchart showing the process of a file relocation procedure in the file selection procedure.

As shown in FIG. 18, in the operation procedure (step F3), the control unit 11 determines whether or not the user makes any key operation from the input unit 15 (step F31).

In a case where the user makes any key operation (step F31; Yes), the control unit 11 determines whether or not the key operation is a termination operation for instructing termination of the file of choice (step F32).

In a case where the key operation is not a termination operation (step F32; No), the control unit 11 performs an operation corresponding to the key operation (step F33), and proceeds to the operation determination procedure (step F2). Operations other than a termination operation include, for example, editing of the file of choice, etc.

In a case where the key operation is a termination operation (step F32; Yes), the control unit 11 closes the file (step F34), undisplays the folder in which the file is stored, and proceeds to the standby procedure (step A0).

On the other hand, in a case where the sensor surface (electrode surface) of the fingerprint sensor 13 is touched by a finger of the user (step F2; Yes), the control unit 11 proceeds to the fingerprint reading procedure (step F4) shown in FIG. 19.

In the fingerprint reading procedure (step F4), the control unit 11 activates the fingerprint sensor 13 to be operable (step F41), and displays the fingerprint icon FP for showing that the fingerprint sensor 13 is in the operable state, in the pictograph area of the screen of the display unit 16 as shown in FIG. 21A (step F42).

When the procedure of step F42 is completed, the control unit 11 counts time until a predetermined period of time (for example, five seconds) passes by an unillustrated timer, and determines whether or not the operation shown in FIG. 21B is made by the user and a fingerprint is detected by the fingerprint sensor 13 within the predetermined period of time (step F43).

If no fingerprint is detected (step F43; No), the control unit 11 inactivates the fingerprint sensor 13 (step F44), and undisplays the fingerprint icon FP in the pictograph area (step F45). After this, the control unit 11 proceeds to the operation determination procedure (step F2), and waits until a finger of the user touches the fingerprint sensor 13.

If a fingerprint is detected as shown in FIG. 21B (step F43; Yes), the control unit 11 compares the fingerprint information read by the fingerprint sensor 13 with the registered fingerprint information in the storage unit 12 (step F46), and determines whether or not the fingerprint characteristics coincide with each other based on the comparison result at the step F46 to authenticate the user (step F47).

If the user authentication ends in failure (step F47; No), the control unit 11 determines that the portable telephone apparatus 1 is operated by an unauthorized irrelevant person, and proceeds to the operation determination procedure (step F2) to wait until a finger of the user touches the fingerprint sensor 13.

If the user authentication ends in success (step F47; Yes), the control unit 11 proceeds to the file relocation procedure (step F5) shown in FIG. 20.

In the file relocation procedure (step F5), first, the control unit 11 determines whether or not the storage area in which the file of choice is stored is the protective storage area 123 (step F51).

If the storage area is the protective storage area 123 (step F51; Yes), the control unit 11 relocates the file of choice to the non-protective storage area 124 to lift the security protection (step F53). At this time, the file of choice is set to a state released from security protection, so that the file can be viewed by any user regardless of whether user authentication is successful or not. When the file of choice is relocated to the data relocation destination, the control unit 11 displays a message shown in FIG. 21C indicating that the file of choice has been relocated on the display unit 16 (step F54).

If the storage area is not the protective storage area 123 (step F51; No), the control unit 11 relocates the file of choice to the protective storage area 123 to place the file of choice under security protection (step F52), and displays a message shown in FIG. 21C indicating that the file of choice has been relocated to the file relocation destination (protective storage area 123) on the display unit 16 (step F54). After this, the control unit 11 proceeds to the operation determination procedure (step F2) to wait until a finger of the user touches the fingerprint sensor 13.

As explained above, the portable telephone apparatus 1 according to the present embodiment controls whether to apply security protection to a given function or a given file arbitrarily selected, only by performing fingerprint authentication while a screen related to the function or the file is displayed.

This releases the user from bothersome operations, and can improve operability and convenience.

In the function selection procedure (step D0), in a case where the user authentication is successful, the control unit 11 determines whether the "user restriction flag" set in the protection setting information in the user restriction flag storage area 122 in association with the function of choice is effective or ineffective, and switches between applying and canceling the user restriction (protection by security) according to the determination result.

This makes it possible to control security protection on the function of choice according to the state of security protection on the function of choice.

In a case where the setting of security protection on the function of choice is changed to be effective while an image related to the function of choice is displayed on the display unit 16, the control unit 11 undisplays the image related to the function of choice. On the other hand, in a case where the setting of security protection is changed to be ineffective, display of the image related to the function of choice is permitted to make the image viewable.

Further, in a case where a touch on the fingerprint sensor 13 is detected while the image related to the function of choice is displayed on the display unit 16, the control unit 11 activates the fingerprint sensor 13 to be operable and displays the fingerprint icon FP indicating that the fingerprint sensor 13 has become operable on the display unit 16.

Therefore, the user can be notified that fingerprint detection by the fingerprint sensor 13 is executable.

In the file selection procedure (step F0), in a case where fingerprint authentication is performed and ends in success while the data of a file arbitrarily selected from among a plurality of files is displayed on the display unit 16, the control unit 11 controls the setting of security protection on the file of choice to be effective or ineffective.

This releases the user from bothersome operations and can improve operability and convenience.

Further, in a case where user authentication is successful in the file selection procedure (step F0), the control unit 11 determines whether the file of choice is stored in the protective storage area 123 in which the setting of security protection is effective, or in the non-protective storage area 124 in which the setting of security protection is ineffective. Then, according to the determination result, the control unit 11 relocates the file of choice from the non-protective storage area 124 to the protective storage area 123 or from the protective storage area 123 to the non-protective storage area 123.

This makes it possible to control the security protection on the file of choice according to the state of security protection on the file of choice.

Further, in a case where a file in the protective storage area 123 is selected, the control unit 11 displays an image corresponding to the file of choice on the display unit 16.

This makes it possible to place the file stored in the protective storage area 123 under security protection.

The present embodiment may be modified as follows.

The control unit 11 may comprise a plurality of sub CPUs corresponding to a data sending/receiving function, a data reproducing function, etc., respectively.

The content and format of the protection setting information are not limited to those exemplified in FIG. 10B, but can be modified appropriately.

Security protection may be applied not only to data in a file unit but also to data in a folder unit. Further, data of a predetermined type (for example, image data, text data, etc.) among the data stored in a predetermined folder may be set under security protection.

Security protection may be applied to a television function, a radio function, an electronic money function, or any other function.

The direction in which a finger is slid when a fingerprint pattern is read by the fingerprint sensor 13 is not limited to an upward or downward direction, but may be a leftward or rightward direction, an oblique direction, or any other arbitrary direction.

Any finger can be used for registration of registered fingerprint information. If fingerprint patterns of a plurality of fingers are registered as registered fingerprint information, more enhanced security is available.

The concept of the present invention is to permit or prohibit the use of a predetermined function or predetermined data, according to the result of user authentication performed by authentication means. Accordingly, in the embodiment of the present invention, arbitrary biometric authentication means can be used.

For example, biometric authentication is not limited to fingerprint authentication, but any method such as vein authentication, face authentication, retina authentication, DNA authentication, vocal print authentication, etc. may be used.

Further, any other authentication means than biometric authentication may be used as the authentication means according to the embodiment of the present invention.

For example, various modifications are available if authentication methods such as authentication based on reading of a contact or contactless IC card, authentication based on reading of a magnetic card, etc. are used.

The structure and operation procedures of the portable telephone apparatus 1 can be modified arbitrarily as long as similar functions can be realized.

For example, program codes transmitted through a transmission medium may be received by the communication unit 17, and the operations of the embodiment of the present invention may be sequentially performed according to the received program codes. Further, if the storage unit 12 is constituted by an external memory, it is possible to realize the operations unique to the embodiment of the preset invention by using programs and data externally supplied.

The display unit 16 may comprise a plurality of display screens such as a main screen, a sub screen, etc.

The concept of the present invention can be applied not only to a purpose-specific computer system, but to arbitrary electronic apparatuses such as a PDA, an electronic camera, an electronic wristwatch, a music player, etc. with a fingerprint authentication function.

That is, a computer program for controlling a computer to function and operate as the portable telephone apparatus 1 may be created, and distributed and rented, so that the program may be installed on a computer to constitute it as a portable terminal 1, which may be used, handed over, or rented.

Various embodiments and changes may be made thereunto without departing from the broad spirit and scope of the invention. The above-described embodiment is intended to illustrate the present invention, not to limit the scope of the present invention. The scope of the present invention is shown by the attached claims rather than the embodiment. Various modifications made within the meaning of an equivalent of the claims of the invention and within the claims are to be regarded to be in the scope of the present invention.

This application is based on Japanese Patent Application No. 2006-138784 filed on May 18, 2006 and including specification, claims, drawings and summary. The disclosure of the above Japanese Patent Application is incorporated herein by reference in its entirety.

What is claimed is:

1. A portable electronic apparatus, comprising:
a biometric information reading unit which reads biometric information of a user;
a storage unit which stores, in association with each of a plurality of functions provided in the portable electronic apparatus, biometric information of an administrator who is entitled to change a flag that indicates whether usage of the each of said plural functions is restricted to certain users;
a function selection unit which selects at least one function from said plural functions;
a display unit which displays an image associated with the selected function;
a determination unit which, in a case where the biometric information is read by the biometric information reading unit while the image associated with the selected function is being displayed, determines whether the read biometric information coincides with the stored biometric information of the administrator associated with the selected function; and
a change unit which changes the flag that is stored in association with the function selected, when the determination unit determines that the read biometric information coincides with the stored biometric information of the administrator associated with the selected function;
wherein when the determination unit determines that the read biometric information and the stored biometric information of the administrator associated with the selected function coincide, and the stored flag indicates that usage of the function is restricted to the certain users, the display unit prohibits the image associated with the selected function from being displayed.

2. The portable electronic apparatus according to claim 1, wherein the biometric information reading unit comprises a touch detection unit which detects whether the touch detection unit is touched by a user,
the portable electronic apparatus further comprises:
a reading control unit which controls reading of biometric information by the biometric information reading unit to switch the biometric information reading unit between being capable of reading the biometric information and being incapable of reading the biometric information; and
a display instructing unit which instructs the display unit to display a message that the biometric information reading unit is capable or incapable of reading the biometric information, according to how the reading control unit controls reading by the biometric information reading unit, and
in a case where the touch detection unit detects a touch by the user while predetermined data instructed by a display signal sent from the function selected by the function selection unit is displayed on the display unit, the reading control unit controls reading by the biometric information reading unit to switch the biometric information reading unit to being capable of reading the biometric information, and the display instructing unit instructs the display unit to display a message that the biometric information reading unit is capable of the reading biometric information.

3. The portable electronic apparatus according to claim 1, wherein the biometric information reading unit comprises a fingerprint sensor for reading a fingerprint pattern of a user, and the biometric information stored in the association information storage unit includes fingerprint information of the administrator, and
in a case where the biometric information of the user is read by the biometric information reading unit while a predetermined function is selected by the function selection unit, the determination unit determines whether the fingerprint pattern of the user read by the fingerprint sensor coincides with a fingerprint pattern of the administrator represented by the fingerprint information stored in the storage unit.

4. A portable electronic apparatus, comprising:
a biometric information reading unit which reads biometric information of a user;
a file storage unit which stores files;
a storage unit which stores, in association with each of a plurality of files stored in the file storage unit, biometric information of an administrator who is entitled to change a flag that indicates whether usage of the each of said plural files is restricted to certain users;
a file selection unit which selects at least one file from the files stored in the file storage unit;
a display unit which displays an image associated with the selected file;
a determination unit which, in a case where the biometric information of the user is read by the biometric information reading unit while the image associated with the selected file is being displayed, determines whether the read biometric information coincides with the biometric information of the administrator associated with the selected file; and
a change unit which changes the flag that is stored in association with the file selected, in response to the determination that the read biometric information coincides with the stored biometric information of the administrator associated with the selected file;
wherein when the determination unit determines that the read biometric information and the stored biometric information of the administrator associated with the selected file coincide, and the stored flag indicates that usage of the file is restricted to the certain users, the display unit prohibits the image associated with the selected file from being displayed.

5. The portable electronic apparatus according to claim 4, wherein the file storage unit includes a protective folder which has its accesser restricted to only the administrator specified by the biometric information stored in the storage unit, and a non-protective folder which does not have its accesser restricted to the administrator specified by the biometric information stored in the storage unit, the portable electronic apparatus further comprises a folder determination unit which determines in which of the protective folder and the non-protective folder the file selected by the file selection unit is stored, and
the change unit relocates the selected file from the protective folder to the non-protective folder in a case where the folder determination unit determines that the selected file is stored in the protective folder in response to the determination that the read biometric information coincides with the biometric information of the administrator, and relocates the selected file from the non-protective folder to the protective folder in a case where the folder determination unit determines that the selected file is stored in the non-protective folder.

6. A non-transitory computer-readable recording medium storing a program for controlling a computer, which comprises: a biometric information reading unit for reading biometric information of a user; a storage unit for storing, in association with each of a plurality of functions provided in the computer, biometric information of an administrator who is entitled to change a flag that indicates whether usage of the each of said plural functions is restricted to certain users, to serve as:
a function selection unit for selecting at least one function from said plural functions;
a display unit that causes a monitor to display an image associated with the function being selected;
a determining unit which, in a case where the biometric information is read by the biometric information unit while the image associated with the selected function is being displayed, determines whether the read biometric information coincides with the stored biometric information of the administrator associated with the selected function; and
a change unit which changes the flag that is stored in association with the function selected by the function selection unit, when the determination unit determines that the read biometric information coincides with the stored biometric information of the administrator associated with the selected function;
wherein when the determination unit determines that the read biometric information and the stored biometric information of the administrator associated with the selected function coincide, and the stored flag indicates that usage of the function is restricted to the certain users, the display unit prohibits the image associated with the selected function from being displayed.

7. A non-transitory computer-readable recording medium storing a program for controlling a computer, which comprises: a biometric information reading unit for reading biometric information of a user; a file storage unit for storing files; a storage unit for storing, in association with each of a plurality of files stored in the file storage unit, biometric information of an administrator entitled to restrict access to the file, and a flag that indicates whether the access to the file is restricted to certain users, to serve as:
a file selection unit for selecting at least one file from said plural files stored in the file storage unit;
a display unit that causes a monitor to display an image associated with the file being selected;
a determining unit which, in a case where the biometric information is read by the biometric information unit while the image associated with the selected file is being displayed, determines whether the read biometric information coincides with the stored biometric information of the administrator associated with the selected file; and
a change unit which changes the flag that is stored in association with the file selected by the file selection unit, when the determination unit determines that the read biometric information coincides with the stored biometric information of the administrator associated with the selected file;
wherein when the determination unit determines that the read biometric information and the stored biometric information of the administrator associated with the selected file coincide, and the stored flag indicates that access to the file is restricted to the certain users, the display unit prohibits the image associated with the selected file from being displayed.

8. The portable electronic apparatus according to claim 1, wherein when the determination unit determines that the read biometric information and the stored biometric information of the administrator associated with the selected function coincide and when the image associated with the selected function is being displayed, the change unit changes the stored flag so that usage of the function is restricted to the certain users, and
when the determination unit determines that the read biometric information and the stored biometric information of the administrator associated with the selected function coincide and the image associated with the selected function is not being displayed, the change unit changes the stored flag so that the restriction of the usage of the function to the certain users is removed.

9. The portable electronic device according to claim 4, wherein when the determination unit determines that the read biometric information and the stored biometric information of the administrator associated with the selected file coincide and when the image associated with the selected file is being displayed, the change unit changes the stored flag so that usage of the file is restricted to the certain users, and when the determination unit determines that the read biometric information and the stored biometric information of the administrator associated with the selected file coincide and the image associated with the selected file is not being displayed, the change unit changes the stored flag so that the restriction of the usage of the file to the certain users is removed.

10. A method for operating a portable electronic apparatus, comprising:
   reading, by a biometric information reading unit, biometric information of a user;
   selecting, by a function selection unit, at least one function from a plurality of functions;
   displaying, at a display unit, an image associated with the selected function;
   determining, at a determination unit, in a case where the biometric information is read by the biometric information reading unit while the image associated with the selected function is being displayed, whether the read biometric information coincides with biometric information of an administrator stored in a memory in association with the selected function; and
   changing, by a change unit, a flag which is stored in the memory in association with the selected function and which indicates whether usage of the function is restricted to certain users, when the determination unit determines that the read biometric information coincides with the stored biometric information of the administrator associated with the selected function;
   wherein when the determination unit determines that the read biometric information and the stored biometric information of the administrator associated with the selected function coincide, and the stored flag indicates that usage of the function is restricted to certain users, the display unit prohibits the image associated with the selected function from being displayed.

11. A method for operating a portable electronic apparatus, comprising:
   reading, by a biometric information reading unit, biometric information of a user;
   selecting, by a file selection unit, at least one files from a plurality of files provided with the portable electronic apparatus;
   displaying, at a display unit, an image associated with the selected file;
   determining, by a determining unit, in a case where the biometric information is read by the biometric information reading unit while the image associated with the selected function is being displayed, whether the read biometric information coincides with stored biometric information of an administrator stored in a memory in association with the selected file; and
   changing, by a change unit, a flag that is stored in the memory in association with the selected file and which indicates whether usage of the file is restricted to certain users, when the determination unit determines that the read biometric information coincides with the stored biometric information of the administrator associated with the selected file;
   wherein when the determination unit determines that the read biometric information and the stored biometric information of the administrator associated with the selected file coincide, and the stored flag indicates that usage of the file is restricted to the certain users the display unit prohibits the image associated with the selected file from being displayed.

* * * * *